United States Patent
Baker et al.

(10) Patent No.: US 10,081,563 B2
(45) Date of Patent: Sep. 25, 2018

(54) SYSTEMS AND METHODS FOR MECHANICALLY BINDING LOOSE SCRAP

(71) Applicant: JOHNS MANVILLE, Denver, CO (US)

(72) Inventors: John Wayne Baker, Golden, CO (US); Mark William Charbonneau, Highlands Ranch, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 14/862,811

(22) Filed: Sep. 23, 2015

(65) Prior Publication Data
US 2017/0081231 A1  Mar. 23, 2017

(51) Int. Cl.
| C03B 1/02 | (2006.01) |
| C03B 5/00 | (2006.01) |
| B30B 3/04 | (2006.01) |
| C03B 5/235 | (2006.01) |

(52) U.S. Cl.
CPC ............... C03B 1/02 (2013.01); B30B 3/04 (2013.01); C03B 5/005 (2013.01); C03B 5/2356 (2013.01)

(58) Field of Classification Search
None
See application file for complete search history.

(56) References Cited

U.S. PATENT DOCUMENTS

| 1,579,353 | A | 4/1926 | Good |
| 1,636,151 | A | 7/1927 | Schofield |
| 1,679,295 | A | 7/1928 | Dodge |
| 1,706,857 | A | 3/1929 | Mathe |
| 1,716,433 | A | 6/1929 | Ellis |
| 1,875,474 | A | 9/1932 | McKinley |
| 1,883,023 | A | 10/1932 | Slick |
| 1,937,321 | A | 11/1933 | Howard |
| 1,944,855 | A | 1/1934 | Wadman |
| 1,989,103 | A | 1/1935 | McKelvey et al. |
| 2,042,560 | A | 6/1936 | Stewart |
| 2,064,546 | A | 12/1936 | Kutchka |
| 2,174,533 | A | 10/1939 | See et al. |
| 2,118,479 | A | 1/1940 | McCaskey |
| 2,269,459 | A | 1/1942 | Kleist |
| 2,432,942 | A | 12/1947 | See et al. |
| 2,455,907 | A | 1/1948 | Slayter |
| 2,658,094 | A | 11/1953 | Nonken |

(Continued)

FOREIGN PATENT DOCUMENTS

| DE | 36 29 965 A1 | 3/1988 |
| DE | 40 00 358 C2 | 3/1993 |

(Continued)

OTHER PUBLICATIONS

"Gamma Irradiators for Radiation Processing" Booklet, International Atomic Energy Agency, Vienna, Austria.

(Continued)

Primary Examiner — Cynthia Szewczyk
(74) Attorney, Agent, or Firm — Robert D. Touslee

(57) ABSTRACT

A method of forming a rope material from a loose feed scrap includes a number of operations to mechanically bind the loose feed scrap. The feed scrap is collected. The feed scrap is twisted and compressed, operations that may be performed simultaneously. This twisted and compressed feed scrap, now in the form of a rope material, is then fed into a melter system.

16 Claims, 8 Drawing Sheets

(56) References Cited

U.S. PATENT DOCUMENTS

| | | | |
|---|---|---|---|
| 2,677,003 A | 4/1954 | Arbeit et al. | |
| 2,679,749 A | 6/1954 | Poole | |
| 2,691,689 A | 10/1954 | Arbeit et al. | |
| 2,718,096 A | 9/1955 | Henry et al. | |
| 2,773,545 A | 12/1956 | Petersen | |
| 2,781,756 A | 2/1957 | Kobe | |
| 2,798,531 A * | 7/1957 | Jackson, Jr. | B01D 29/111 156/174 |
| 2,867,972 A | 1/1959 | Holderreed et al. | |
| 2,878,644 A | 3/1959 | Fenn | |
| 2,890,166 A | 6/1959 | Heinze | |
| 2,902,029 A | 9/1959 | Hill | |
| 2,981,250 A | 4/1961 | Stewart | |
| 3,020,165 A | 2/1962 | Davis | |
| 3,056,283 A | 10/1962 | Tiede | |
| 3,073,683 A | 1/1963 | Switzer et al. | |
| 3,084,392 A | 4/1963 | Labino | |
| 3,088,812 A | 5/1963 | Bitterlich et al. | |
| 3,104,947 A | 9/1963 | Switzer et al. | |
| 3,129,087 A | 4/1964 | Hagy | |
| 3,160,578 A | 12/1964 | Saxton et al. | |
| 3,165,452 A | 1/1965 | Williams | |
| 3,170,781 A | 2/1965 | Keefer | |
| 3,174,820 A | 3/1965 | See et al. | |
| 3,215,189 A | 11/1965 | Bauer | |
| 3,224,855 A | 12/1965 | Plumat | |
| 3,226,220 A | 12/1965 | Plumat | |
| 3,237,929 A | 3/1966 | Plumat et al. | |
| 3,239,325 A | 3/1966 | Roberson et al. | |
| 3,241,548 A | 3/1966 | See et al. | |
| 3,245,769 A | 4/1966 | Eck et al. | |
| 3,248,205 A | 4/1966 | Dolf et al. | |
| 3,248,206 A | 4/1966 | Apple et al. | |
| 3,260,587 A | 7/1966 | Dolf et al. | |
| 3,268,313 A | 8/1966 | Burgman et al. | |
| 3,285,834 A | 11/1966 | Guerrieri et al. | |
| 3,294,512 A | 12/1966 | Penberthy | |
| 3,325,298 A | 6/1967 | Brown | |
| 3,375,095 A | 3/1968 | Poole | |
| 3,380,463 A | 4/1968 | Trethewey | |
| 3,385,686 A | 5/1968 | Plumat et al. | |
| 3,402,025 A | 9/1968 | Garrett et al. | |
| 3,407,805 A | 10/1968 | Bougard | |
| 3,407,862 A | 10/1968 | Mustian, Jr. | |
| 3,420,510 A | 1/1969 | Griem | |
| 3,421,873 A | 1/1969 | Burgman et al. | |
| 3,421,876 A | 1/1969 | Schmidt | |
| 3,432,399 A | 3/1969 | Schutt | |
| 3,442,633 A | 5/1969 | Perry | |
| 3,445,214 A | 5/1969 | Oremesher | |
| 3,498,779 A | 3/1970 | Hathaway | |
| 3,510,393 A | 5/1970 | Burgman et al. | |
| 3,519,412 A | 7/1970 | Olink | |
| 3,525,674 A | 8/1970 | Barnebey | |
| 3,533,770 A | 10/1970 | Adler et al. | |
| 3,547,611 A | 12/1970 | Williams | |
| 3,563,683 A | 2/1971 | Hess | |
| 3,573,016 A | 3/1971 | Rees | |
| 3,573,887 A * | 4/1971 | Mod et al. | C03B 1/00 65/134.3 |
| 3,592,151 A | 7/1971 | Webber | |
| 3,592,623 A | 7/1971 | Shepherd | |
| 3,600,149 A | 8/1971 | Chen et al. | |
| 3,606,825 A | 9/1971 | Johnson | |
| 3,617,234 A | 11/1971 | Hawkins et al. | |
| 3,627,504 A | 12/1971 | Johnson et al. | |
| 3,632,335 A | 1/1972 | Womer | |
| 3,692,017 A | 9/1972 | Glachant et al. | |
| 3,717,139 A | 2/1973 | Guillet et al. | |
| 3,738,792 A | 6/1973 | Feng | |
| 3,741,656 A | 6/1973 | Shapiro | |
| 3,741,742 A | 6/1973 | Jennings | |
| 3,746,527 A | 7/1973 | Knavish et al. | |
| 3,747,588 A | 7/1973 | Malmin | |
| 3,754,879 A | 8/1973 | Phaneuf | |
| 3,756,800 A | 9/1973 | Phaneuf | |
| 3,763,915 A | 10/1973 | Perry et al. | |
| 3,764,287 A | 10/1973 | Brocious | |
| 3,771,988 A | 11/1973 | Starr | |
| 3,788,832 A | 1/1974 | Nesbitt | |
| 3,818,893 A | 6/1974 | Kataoka et al. | |
| 3,835,909 A | 9/1974 | Douglas et al. | |
| 3,840,002 A | 10/1974 | Douglas et al. | |
| 3,856,496 A | 12/1974 | Nesbitt et al. | |
| 3,885,945 A | 5/1975 | Rees et al. | |
| 3,907,585 A | 9/1975 | Francel et al. | |
| 3,913,560 A | 10/1975 | Lazarre et al. | |
| 3,929,445 A | 12/1975 | Zippe | |
| 3,936,290 A | 2/1976 | Cerutti et al. | |
| 3,951,635 A | 4/1976 | Rough | |
| 3,976,464 A | 8/1976 | Wardlaw | |
| 4,001,001 A | 1/1977 | Knavish et al. | |
| 4,004,903 A | 1/1977 | Daman et al. | |
| 4,028,083 A | 6/1977 | Patznick et al. | |
| 4,083,711 A | 4/1978 | Jensen | |
| 4,101,304 A | 7/1978 | Marchand | |
| 4,110,098 A | 8/1978 | Mattmuller | |
| 4,153,438 A | 5/1979 | Stream | |
| 4,185,982 A | 1/1980 | Schwenninger | |
| 4,203,761 A | 5/1980 | Rose | |
| 4,205,966 A | 6/1980 | Horikawa | |
| 4,208,201 A | 6/1980 | Rueck | |
| 4,226,564 A | 10/1980 | Takahashi et al. | |
| 4,238,226 A | 12/1980 | Sanzenbacher et al. | |
| 4,249,927 A | 2/1981 | Fakuzaki et al. | |
| 4,270,740 A | 6/1981 | Sanzenbacher et al. | |
| 4,282,023 A | 8/1981 | Hammel et al. | |
| 4,303,435 A | 12/1981 | Sleighter | |
| 4,309,204 A | 1/1982 | Brooks | |
| 4,316,734 A | 2/1982 | Spinosa et al. | |
| 4,323,718 A | 4/1982 | Buhring et al. | |
| 4,349,376 A | 9/1982 | Dunn et al. | |
| 4,360,373 A | 11/1982 | Pecoraro | |
| 4,397,692 A | 8/1983 | Ramge et al. | |
| 4,398,925 A | 8/1983 | Trinh et al. | |
| 4,405,351 A | 9/1983 | Sheinkop | |
| 4,406,683 A | 9/1983 | Demarest | |
| 4,413,882 A | 11/1983 | Bailey et al. | |
| 4,424,071 A | 1/1984 | Steitz et al. | |
| 4,432,780 A | 2/1984 | Propster et al. | |
| 4,455,762 A | 6/1984 | Saeman | |
| 4,461,576 A | 7/1984 | King | |
| 4,488,537 A | 12/1984 | Laurent | |
| 4,508,970 A | 4/1985 | Ackerman | |
| 4,539,034 A | 9/1985 | Hanneken | |
| 4,542,106 A | 9/1985 | Sproull | |
| 4,545,800 A | 10/1985 | Won et al. | |
| 4,549,896 A | 10/1985 | Streicher et al. | |
| 4,599,100 A | 7/1986 | Demarest | |
| 4,622,007 A | 11/1986 | Gitman | |
| 4,626,199 A | 12/1986 | Bounini | |
| 4,632,687 A | 12/1986 | Kunkle et al. | |
| 4,634,461 A | 1/1987 | Demarest, Jr. et al. | |
| 4,657,586 A | 4/1987 | Masterson et al. | |
| 4,718,931 A | 1/1988 | Boettner | |
| 4,723,708 A | 2/1988 | Berger et al. | |
| 4,735,642 A | 4/1988 | Jensen et al. | |
| 4,738,938 A | 4/1988 | Kunkle et al. | |
| 4,758,259 A | 7/1988 | Jensen | |
| 4,794,860 A | 1/1989 | Welton | |
| 4,798,616 A | 1/1989 | Knavish et al. | |
| 4,812,372 A | 3/1989 | Kithany | |
| 4,814,387 A | 3/1989 | Donat | |
| 4,816,056 A | 3/1989 | Tsai et al. | |
| 4,818,265 A | 4/1989 | Krumwiede et al. | |
| 4,877,436 A | 10/1989 | Sheinkop | |
| 4,877,449 A | 10/1989 | Khinkis | |
| 4,878,829 A | 11/1989 | Anderson | |
| 4,882,736 A | 11/1989 | Pieper | |
| 4,886,539 A | 12/1989 | Gerutti et al. | |
| 4,900,337 A | 2/1990 | Zortea et al. | |
| 4,919,700 A | 4/1990 | Pecoraro et al. | |
| 4,927,886 A | 5/1990 | Backderf et al. | |
| 4,932,035 A | 6/1990 | Pieper | |

(56) References Cited

U.S. PATENT DOCUMENTS

| | | |
|---|---|---|
| 4,953,376 A | 9/1990 | Merlone |
| 4,963,731 A | 10/1990 | King |
| 4,969,942 A | 11/1990 | Schwenninger et al. |
| 4,973,346 A | 11/1990 | Kobayashi et al. |
| 5,011,086 A | 4/1991 | Sonnleitner |
| 5,032,230 A | 7/1991 | Shepherd |
| 5,052,874 A | 10/1991 | Johanson |
| 5,062,789 A | 11/1991 | Gitman |
| 5,097,802 A | 3/1992 | Clawson |
| 5,168,109 A | 12/1992 | Backderf et al. |
| 5,169,424 A | 12/1992 | Grinnen et al. |
| 5,194,747 A | 3/1993 | Culpepper et al. |
| 5,199,866 A | 4/1993 | Joshi et al. |
| 5,204,082 A | 4/1993 | Schendel |
| 5,299,929 A | 4/1994 | Yap |
| 5,360,171 A | 11/1994 | Yap |
| 5,374,595 A | 12/1994 | Dumbaugh et al. |
| 5,405,082 A | 4/1995 | Brown et al. |
| 5,412,882 A | 5/1995 | Zippe et al. |
| 5,449,286 A | 9/1995 | Snyder et al. |
| 5,473,885 A | 12/1995 | Hunter, Jr. et al. |
| 5,483,548 A | 1/1996 | Coble |
| 5,490,775 A | 2/1996 | Joshi et al. |
| 5,522,721 A | 6/1996 | Drogue et al. |
| 5,545,031 A | 8/1996 | Joshi et al. |
| 5,575,637 A | 11/1996 | Slavejkov et al. |
| 5,586,999 A | 12/1996 | Kobayashi |
| 5,595,703 A | 1/1997 | Swaelens et al. |
| 5,606,965 A | 3/1997 | Panz et al. |
| 5,613,994 A | 3/1997 | Muniz et al. |
| 5,615,668 A | 4/1997 | Panz et al. |
| 5,636,623 A | 6/1997 | Panz et al. |
| 5,672,827 A | 9/1997 | Jursich |
| 5,713,668 A | 2/1998 | Lunghofer et al. |
| 5,718,741 A | 2/1998 | Hull et al. |
| 5,724,901 A | 3/1998 | Guy et al. |
| 5,736,476 A | 4/1998 | Watzke et al. |
| 5,743,723 A | 4/1998 | Iatrides et al. |
| 5,765,964 A | 6/1998 | Calcote et al. |
| 5,772,126 A * | 6/1998 | Hanvey, Jr. ............ B03B 9/062 241/152.2 |
| 5,814,121 A | 9/1998 | Travis |
| 5,829,962 A | 11/1998 | Drasek et al. |
| 5,833,447 A | 11/1998 | Bodelin et al. |
| 5,849,058 A | 12/1998 | Takeshita et al. |
| 5,863,195 A | 1/1999 | Feldermann |
| 5,887,978 A | 3/1999 | Lunghofer et al. |
| 5,944,507 A | 8/1999 | Feldermann |
| 5,944,864 A | 8/1999 | Hull et al. |
| 5,954,498 A | 9/1999 | Joshi et al. |
| 5,975,886 A | 11/1999 | Phillippe |
| 5,979,191 A | 11/1999 | Jian |
| 5,984,667 A | 11/1999 | Phillippe et al. |
| 5,993,203 A | 11/1999 | Koppang |
| 6,029,910 A | 2/2000 | Joshi et al. |
| 6,036,480 A | 3/2000 | Hughes et al. |
| 6,039,787 A | 3/2000 | Edlinger |
| 6,044,667 A | 4/2000 | Chenoweth |
| 6,045,353 A | 4/2000 | VonDrasek et al. |
| 6,068,468 A | 5/2000 | Phillipe et al. |
| 6,071,116 A | 6/2000 | Phillipe et al. |
| 6,074,197 A | 6/2000 | Phillippe |
| 6,077,072 A | 6/2000 | Marin et al. |
| 6,085,551 A | 7/2000 | Pieper et al. |
| 6,109,062 A | 8/2000 | Richards |
| 6,113,389 A | 9/2000 | Joshi et al. |
| 6,116,896 A | 9/2000 | Joshi et al. |
| 6,120,889 A | 9/2000 | Turner et al. |
| 6,123,542 A | 9/2000 | Joshi et al. |
| 6,126,438 A | 10/2000 | Joshi et al. |
| 6,154,481 A | 11/2000 | Sorg et al. |
| 6,156,285 A | 12/2000 | Adams et al. |
| 6,171,100 B1 | 1/2001 | Joshi et al. |
| 6,178,777 B1 | 1/2001 | Chenoweth |
| 6,183,848 B1 | 2/2001 | Turner et al. |
| 6,210,151 B1 | 4/2001 | Joshi et al. |
| 6,210,703 B1 | 4/2001 | Novich |
| 6,237,369 B1 | 5/2001 | LeBlanc et al. |
| 6,241,514 B1 | 6/2001 | Joshi et al. |
| 6,244,197 B1 | 6/2001 | Coble |
| 6,244,857 B1 | 6/2001 | VonDrasek et al. |
| 6,247,315 B1 | 6/2001 | Marin et al. |
| 6,250,136 B1 | 6/2001 | Igreja |
| 6,250,916 B1 | 6/2001 | Phillipe et al. |
| 6,274,164 B1 | 8/2001 | Novich |
| 6,276,924 B1 | 8/2001 | Joshi et al. |
| 6,276,928 B1 | 8/2001 | Joshi et al. |
| 6,293,277 B1 | 9/2001 | Panz et al. |
| 6,314,760 B1 | 11/2001 | Chenoweth |
| 6,314,896 B1 | 11/2001 | Marin et al. |
| 6,332,339 B1 | 12/2001 | Kawaguchi et al. |
| 6,338,337 B1 | 1/2002 | Panz et al. |
| 6,339,610 B1 | 1/2002 | Hoyer et al. |
| 6,344,747 B1 | 2/2002 | Lunghofer et al. |
| 6,357,264 B1 | 3/2002 | Richards |
| 6,386,271 B1 | 5/2002 | Kawamoto et al. |
| 6,418,755 B2 | 7/2002 | Chenoweth |
| 6,422,041 B1 | 7/2002 | Simpson et al. |
| 6,454,562 B1 | 9/2002 | Joshi et al. |
| 6,460,376 B1 | 10/2002 | Jeanvoine et al. |
| 6,536,238 B2 | 3/2003 | Kawaguchi et al. |
| 6,536,651 B2 | 3/2003 | Ezumi et al. |
| 6,558,606 B1 | 5/2003 | Kulkarni et al. |
| 6,578,779 B2 | 6/2003 | Dion |
| 6,660,106 B1 | 12/2003 | Babel et al. |
| 6,694,791 B1 | 2/2004 | Johnson et al. |
| 6,701,617 B2 | 3/2004 | Li et al. |
| 6,701,751 B2 | 3/2004 | Arechaga et al. |
| 6,705,118 B2 | 3/2004 | Simpson et al. |
| 6,708,527 B1 | 3/2004 | Ibarlucea et al. |
| 6,711,942 B2 | 3/2004 | Getman et al. |
| 6,715,319 B2 | 4/2004 | Barrow et al. |
| 6,722,161 B2 | 4/2004 | LeBlanc |
| 6,736,129 B1 | 5/2004 | Sjith |
| 6,739,152 B2 | 5/2004 | Jeanvoine et al. |
| 6,796,147 B2 | 9/2004 | Borysowicz et al. |
| 6,797,351 B2 | 9/2004 | Kulkarni et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 6,918,256 B2 | 7/2005 | Gutmark et al. |
| 7,027,467 B2 | 4/2006 | Baev et al. |
| 7,116,888 B1 | 10/2006 | Aitken et al. |
| 7,134,300 B2 | 11/2006 | Hayes et al. |
| 7,168,395 B2 | 1/2007 | Engdahl |
| 7,175,423 B1 | 2/2007 | Pisano et al. |
| 7,231,788 B2 | 6/2007 | Karetta et al. |
| 7,273,583 B2 | 9/2007 | Rue et al. |
| 7,330,634 B2 | 2/2008 | Aitken et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,686 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |
| 7,565,819 B2 | 7/2009 | Jeanvoine et al. |
| 7,578,988 B2 | 8/2009 | Jacques et al. |
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,748,592 B2 | 7/2010 | Koga et al. |
| 7,767,606 B2 | 8/2010 | McGinnis et al. |
| 7,778,290 B2 | 8/2010 | Sacks et al. |
| 7,781,562 B2 | 8/2010 | Crawford et al. |
| 7,802,452 B2 | 9/2010 | Borders et al. |
| 7,832,365 B2 | 11/2010 | Hannum et al. |
| 7,845,314 B2 | 12/2010 | Smith |
| 7,855,267 B2 | 12/2010 | Crawford et al. |
| 7,946,136 B2 | 5/2011 | Watkinson |
| 8,033,254 B2 | 10/2011 | Hannum et al. |
| 8,279,899 B2 | 10/2012 | Kitabayashi |
| 8,285,411 B2 | 10/2012 | Hull et al. |
| 8,402,787 B2 | 3/2013 | Pernode et al. |

(56) References Cited

U.S. PATENT DOCUMENTS

| | | |
|---|---|---|
| 8,424,342 B2 | 4/2013 | Kiefer et al. |
| 8,487,262 B2 | 7/2013 | Damm et al. |
| 8,650,914 B2 | 2/2014 | Charbonneau |
| 8,707,739 B2 | 4/2014 | Huber et al. |
| 8,707,740 B2 | 4/2014 | Huber et al. |
| 8,769,992 B2 | 7/2014 | Huber |
| 8,875,544 B2 | 11/2014 | Charbonneau |
| 8,973,400 B2 | 3/2015 | Charbonneau et al. |
| 8,973,405 B2 | 3/2015 | Charbonneau et al. |
| 8,991,215 B2 | 3/2015 | Shock et al. |
| 8,997,525 B2 | 4/2015 | Shock et al. |
| 9,021,838 B2 | 5/2015 | Charbonneau et al. |
| 9,032,760 B2 | 5/2015 | Charbonneau et al. |
| 9,096,452 B2 | 8/2015 | Charbonneau et al. |
| 9,096,453 B2 | 8/2015 | Charbonneau |
| 2001/0039813 A1 | 11/2001 | Simpson et al. |
| 2002/0086077 A1 | 7/2002 | Noller et al. |
| 2002/0124598 A1 | 9/2002 | Borysowicz et al. |
| 2002/0134112 A1 | 9/2002 | Barrow et al. |
| 2002/0152770 A1 | 10/2002 | Becher et al. |
| 2002/0162358 A1 | 11/2002 | Jeanvoine et al. |
| 2002/0166343 A1 | 11/2002 | LeBlanc |
| 2003/0000250 A1 | 1/2003 | Arechaga et al. |
| 2003/0015000 A1 | 1/2003 | Hayes et al. |
| 2003/0029197 A1 | 2/2003 | Jeanvoine et al. |
| 2003/0037571 A1 | 2/2003 | Kobayashi et al. |
| 2004/0025569 A1 | 2/2004 | Damm et al. |
| 2004/0099009 A1 | 5/2004 | Linz et al. |
| 2004/0128098 A1 | 7/2004 | Neuhaus et al. |
| 2004/0131988 A1 | 7/2004 | Baker et al. |
| 2004/0168474 A1 | 9/2004 | Jeanvoine et al. |
| 2004/0224833 A1 | 11/2004 | Jeanvoine et al. |
| 2005/0039491 A1 | 2/2005 | Maugendre et al. |
| 2005/0061030 A1 | 3/2005 | Ichinose et al. |
| 2005/0083989 A1 | 4/2005 | Leister et al. |
| 2005/0103323 A1 | 5/2005 | Engdal |
| 2005/0236747 A1 | 10/2005 | Rue et al. |
| 2006/0000239 A1 | 1/2006 | Jeanvoine et al. |
| 2006/0101859 A1 | 5/2006 | Takagi et al. |
| 2006/0122450 A1 | 6/2006 | Kim et al. |
| 2006/0144089 A1 | 7/2006 | Eichholz et al. |
| 2006/0162387 A1 | 7/2006 | Schmitt et al. |
| 2006/0174655 A1 | 8/2006 | Kobayashi et al. |
| 2006/0177785 A1 | 8/2006 | Varagani et al. |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293494 A1 | 12/2006 | Crawford et al. |
| 2006/0293495 A1 | 12/2006 | Crawford et al. |
| 2007/0051136 A1 | 3/2007 | Watkinson |
| 2007/0106054 A1 | 5/2007 | Crawford et al. |
| 2007/0122332 A1 | 5/2007 | Jacques et al. |
| 2007/0130994 A1 | 6/2007 | Boratav et al. |
| 2007/0137259 A1 | 6/2007 | Borders et al. |
| 2007/0212546 A1 | 9/2007 | Jeanvoine et al. |
| 2007/0220922 A1 | 9/2007 | Bauer et al. |
| 2007/0266737 A1 | 11/2007 | Rodek et al. |
| 2007/0278404 A1 | 12/2007 | Spanke et al. |
| 2008/0035078 A1 | 2/2008 | Li |
| 2008/0227615 A1 | 9/2008 | McGinnis et al. |
| 2008/0256981 A1 | 10/2008 | Jacques et al. |
| 2008/0276652 A1 | 11/2008 | Bauer et al. |
| 2008/0278404 A1 | 11/2008 | Blalock et al. |
| 2008/0293857 A1 | 11/2008 | Crawford et al. |
| 2008/0302136 A1 | 12/2008 | Bauer et al. |
| 2009/0042709 A1 | 2/2009 | Jeanvoine et al. |
| 2009/0044568 A1 | 2/2009 | Lewis |
| 2009/0120133 A1 | 5/2009 | Fraley et al. |
| 2009/0176639 A1 | 7/2009 | Jacques et al. |
| 2009/0220899 A1 | 9/2009 | Spangelo et al. |
| 2009/0235695 A1 | 9/2009 | Pierrot et al. |
| 2009/0320525 A1 | 12/2009 | Johnson |
| 2010/0064732 A1 | 3/2010 | Jeanvoine et al. |
| 2010/0087574 A1 | 4/2010 | Crawford et al. |
| 2010/0089383 A1 | 4/2010 | Cowles |
| 2010/0120979 A1 | 5/2010 | Crawford et al. |
| 2010/0139325 A1 | 6/2010 | Watkinson |
| 2010/0143601 A1 | 6/2010 | Hawtof et al. |
| 2010/0162757 A1 | 7/2010 | Brodie |
| 2010/0227971 A1 | 9/2010 | Crawford et al. |
| 2010/0236323 A1 | 9/2010 | D'Angelico et al. |
| 2010/0242543 A1 | 9/2010 | Ritter et al. |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0313604 A1 | 12/2010 | Watson et al. |
| 2010/0319404 A1 | 12/2010 | Borders et al. |
| 2010/0326137 A1 | 12/2010 | Rouchy et al. |
| 2011/0048125 A1 | 3/2011 | Jackson et al. |
| 2011/0054091 A1 | 3/2011 | Crawford et al. |
| 2011/0061642 A1 | 3/2011 | Rouchy et al. |
| 2011/0088432 A1 | 4/2011 | Purnode et al. |
| 2011/0107670 A1 | 5/2011 | Galley et al. |
| 2011/0236846 A1 | 9/2011 | Rue et al. |
| 2011/0308280 A1 | 12/2011 | Huber |
| 2012/0033792 A1 | 2/2012 | Kulik et al. |
| 2012/0077135 A1* | 3/2012 | Charbonneau ............ C03B 3/00 432/11 |
| 2012/0104306 A1 | 5/2012 | Kamiya et al. |
| 2012/0207439 A1* | 8/2012 | Okada ............... C03B 37/02745 385/146 |
| 2012/0216567 A1 | 8/2012 | Boughton et al. |
| 2012/0216568 A1 | 8/2012 | Fisher et al. |
| 2012/0216576 A1 | 8/2012 | Boughton et al. |
| 2013/0072371 A1 | 3/2013 | Jansen et al. |
| 2013/0086944 A1 | 4/2013 | Shock et al. |
| 2013/0086949 A1 | 4/2013 | Charbonneau |
| 2013/0086950 A1 | 4/2013 | Huber et al. |
| 2013/0086951 A1 | 4/2013 | Charbonneau et al. |
| 2013/0086952 A1 | 4/2013 | Charbonneau et al. |
| 2013/0123990 A1 | 5/2013 | Kulik et al. |
| 2013/0279532 A1 | 10/2013 | Ohmstede et al. |
| 2013/0283861 A1 | 10/2013 | Mobley et al. |
| 2013/0327092 A1 | 12/2013 | Charbonneau |
| 2014/0090422 A1 | 4/2014 | Charbonneau et al. |
| 2014/0090423 A1 | 4/2014 | Charbonneau et al. |
| 2014/0144185 A1 | 5/2014 | Shock et al. |

FOREIGN PATENT DOCUMENTS

| | | |
|---|---|---|
| DE | 44 24 814 A1 | 1/1996 |
| DE | 196 19 919 A1 | 8/1997 |
| DE | 100 29 983 A1 | 1/2002 |
| DE | 100 29 983 C2 | 9/2003 |
| DE | 10 2005 033330 B3 | 8/2006 |
| EP | 0 181 248 B1 | 10/1989 |
| EP | 1 337 789 B1 | 12/2004 |
| EP | 1 990 321 A1 | 11/2008 |
| EP | 2 133 315 A1 | 12/2009 |
| EP | 2 138 465 A2 | 12/2009 |
| EP | 1 986 966 B1 | 4/2010 |
| EP | 1 667 934 B1 | 2/2011 |
| EP | 2 397 446 A2 | 12/2011 |
| EP | 2 404 880 A1 | 1/2012 |
| EP | 2 433 911 A1 | 4/2013 |
| EP | 2 578 548 A2 | 4/2013 |
| FR | 2 740 860 A1 | 9/1997 |
| GB | 191301772 | 1/1914 |
| GB | 191407633 | 3/1914 |
| GB | 164073 A | 5/1921 |
| GB | 1449439 | 9/1976 |
| IT | 1208172 | 7/1989 |
| JP | S58 199728 A | 11/1983 |
| KR | 2000 0050572 A | 8/2000 |
| KR | 100465272 B1 | 12/2004 |
| RO | 114827 | 7/1999 |
| WO | 19998055411 A1 | 12/1998 |
| WO | 2008103291 A1 | 8/2008 |
| WO | 2009091558 A1 | 7/2009 |
| WO | 2010011701 A2 | 1/2010 |
| WO | 2010045196 A3 | 4/2010 |
| WO | 2012048790 A1 | 4/2012 |

(56) References Cited

FOREIGN PATENT DOCUMENTS

OTHER PUBLICATIONS

Furman, BJ, ME 120 Experimental Methods Vibration Measurement, San Jose University Department of Mechanical and Aerospace Engineering.

Higley, BA, Glass Melter System Technologies for Vitrification of High-Sodium Content Low-Level, Radioactive, Liquid Wastes—Phase I: SBS Demonstration With Simulated Low-Level Waste—Final Test Report, Westinghouse Hanford Company.

Report for Treating Hanford LAW and WTP SW Simulants: Pilot Plant Mineralizing Flowsheet Apr. 2009, Department of Energy Environmental Management Consolidated Business Center by THOR Treatment Technologies, LLC.

Gerber, J., "Les Densimetres Industriels," Petrole et Techniques, Association Francaise des Techniciens du Petrole, Jun. 1, 1989, pp. 26-27 No. 349, Paris, France.

Rue et al, "Submerged Combustion Melting of Glass," International Journal of Applied Glass Science, Nov. 9, 2011, pp. 262-274, vol. 2, No. 4.

National Laboratory, US DOE contract No. DE-AC09-08SR22470, Oct. 2011.

"AccuTru Temperature Measurement," AccuTru International Corporation, 2003.

"Glass Technologies—The Legacy of a Successful Public-Private Partnership", 2007, U.S. Department of Energy, pp. 1-32.

"Glass Melting Technology—A Technical and Economic Assessment," 2004, U.S. Department of Energy, pp. 1-292.

Muijsenberg, H. P. H., Neff, G., Muller, J., Chmelar, J., Bodi, R and Matustikj, F. (2008) "An Advanced Control System to Increase Glass Quality and Glass Production Yields Based on GS ESLLI Technology", in a Collection of Papers Presented at the 66th Conference on Glass Problems: Ceramic Engineering and Science Proceedings, vol. 27, Issue 1 (ed W. M. Kriven), John Wiley & Sons, Inc., Hoboken, NJ, USA. doi: 10.1002/9780470291306.ch3.

Rue, "Energy-Efficient Glass Melting—The Next Generation Melter", Gas Technology Institute, Project No. 20621 Final Report (2008).

Muijsenberg, E., Eisenga, M. and Buchmayer, J. (2010) "Increase of Glass Production Efficiency and Energy Efficiency With Model-Based Predictive Control", in 70th Conference on Glass Problems: Ceramic Engineering and Science Proceedings, vol. 31, Issue 1 (ed C. H. Drummond), John Wiley & Sons, Inc., Hoboken, NJ, USA. doi: 10.1002/9780470769843.ch15.

Sims, Richard, "Batch charging technologies—a review", www.glassonweb.com, Nikolaus Sorg Gmbh & Co KG (May 2011).

"Canty Process Technology" brochure, date unknown, American Institute of Chemical Engineers, Spring Meeting, Houston, TX.

"Glass Melting", Battelle PNNL MST Handbook, U.S. Department of Energy, Pacific Northwest Laboratory, retrieved from the Internet Apr. 20, 2012.

"Roll Compaction", brochure from The Fitzpatrick Company, Elmhurst, Illinois, retrieved from the Internet Apr. 20, 2012.

"Glass Industry of the Future", United States Department of Energy, report 02-GA50113-03, pp. 1-17, Sep. 2008.

Stevenson, "Foam Engineering: Fundamentals and Applications", Chapter 16, pp. 336-389, John Wiley & Sons (Mar. 13, 2012).

Clare et al., "Density and Surface Tension of Borate Containing Silicate Melts", Glass Technology—European Journal of Glass Science and Technology, Part A, pp. 59-62, vol. 44, No. 2, Apr. 1, 2003.

Seward, T.P., "Modeling of Glass Making Processes for Improved Efficiency", DE-FG07-96EE41262, Final Report, Mar. 31, 2003.

Conradt et al, Foaming behavior on glass melts, Glastechniche Berichte 60 (1987) Nr. 6, S. 189-201 Abstract Fraunhofer ISC.

Kim et al., "Foaming in Glass Melts Produced by Sodium Sulfate Decomposition under Isothermal Conditions", Journal of the American Ceramic Society, 74(3), pp. 551-555, 1991.

Kim et al., "Foaming in Glass Melts Produced by Sodium Sulfate Decomposition under Ramp Heating Conditions", Jounal of the American Ceramic Society, 75(11), pp. 2959-2963, 1992.

Kim et al., "Effect of Furnace Atmosphere on E-glass Foaming", Journal of Non-Crystalline Solids, 352(50/51), pp. 5297-5295, 2006.

Van Limpt et al., "Modelling the evaporation of boron species. Part 1. Alkali-free borosilicate glass melts", Glass Technology—European Journal of Glass Science and Technology, Part A, 52(3): pp. 77-87, 2011.

Oblain, V.M. et al, "Submerged Combustion Furnace for Glass melts," Ceramic Engineering and Science Proceedings, Jan. 1, 1996, pp. 84-92, vol. 17—No. 2, American Ceramic Society Inc., US.

\* cited by examiner

SYSTEMS AND METHODS FOR MECHANICALLY BINDING LOOSE SCRAP

BACKGROUND

In submerged combustion melting (SCM), combustion gases are injected beneath a surface of a molten matrix and rise upward through the melt. The matrix can include glass and/or inorganic non-metallic raw feedstocks such as rock (basalt) and mineral wool (stone wool). Regardless of the material utilized, it is heated at a high efficiency via the intimate contact with the combustion gases and melts into a matrix. Using submerged combustion burners produces violent turbulence of the molten matrix and results in a high degree of mechanical energy in the submerged combustion melter. The raw material is introduced so as to ensure sufficient time to melt the material into the matrix and to avoid cool spots in the matrix.

SUMMARY

In one aspect, the technology relates to a method including: collecting, at a collection station, loose feed scrap; feeding the loose feed scrap to a compression station where the loose feed scrap is compressed into a compressed feed scrap having a density higher than a density of the loose feed scrap; feeding the loose feed scrap to a twisting station where the loose feed scrap is twisted into a bound feed scrap having a substantially continuous length greater than a length of the loose feed scrap; feeding at least one of the compressed feed scrap and the bound feed scrap to an exit station, wherein the at least one of the compressed feed scrap and the bound feed scrap exit the exit station as a rope of scrap; and delivering the rope of scrap to a melter system. In an example, the compression station and the twisting station are a combined station. In another example, the compression station includes a plurality of compression stations and the twisting station includes a plurality of twisting stations. In yet another embodiment, at least one of the feeding operations include moving a material via at least one conveyor. In still another embodiment, the collection station includes a plurality of conveyors configured to move the loose feed scrap.

In another embodiment of the above aspect, the plurality of conveyors of the collection station are configured to move in a generally forward direction and a generally backward direction. In another embodiment, the combined station includes a plurality of rollers. In yet another example, the plurality of rollers are disposed at an angle to a general direction of movement of the loose feed scrap. In still another example, the rope of feed scrap is delivered to a melter system at an entry port of an SCM melt vessel, wherein the SCM port has a port temperature lower than a temperature of the SCM melt vessel.

In another aspect, the technology relates to a method including: collecting a feed scrap; twisting the feed scrap; compressing the feed scrap; and feeding the twisted feed scrap and the compressed feed scrap into a melter system. In an example, the twisting operation and compression operation are performed substantially simultaneously. In another example, the method includes forming the compressed feed scrap and the twisted feed scrap into a substantially continuous rope. In yet another example, the forming operation is performed substantially simultaneously with the twisting operation and the compressing operation. In still another example, the rope is fed into the melter system during the feeding operation.

In another example of the above aspect, the twisting operation and the compression operation are performed in a plurality of discrete operations between the collecting operation and the feeding operation. In yet another example, the twisting operation and the compression operation are performed at a first simultaneous operation to produce a first twisted, compressed feed scrap output having a first diameter and a first density. In still another example, the twisting operation and the compression operation are performed at a second simultaneous operation downstream of the first simultaneous operation to produce a second twisted, compressed feed scrap output having a second diameter less than the first diameter and second density greater than the first density.

In another aspect, the technology relates to a method of forming a rope material from a loose feed scrap, the method including: substantially simultaneously advancing, twisting, and compressing the loose scrap feed until the rope material is formed.

In another aspect, the technology relates to a system including: a collection station for collecting feed scrap; an advancing mechanism for advancing the feed scrap through the system; a first twisting station for twisting the feed scrap; a first compressing station for compressing the feed scrap; and a feed station for feeding the feed scrap into a melter system. In an example, the first twisting station and the first compressing station are contained in a first combination station. In another example, the system includes a second twisting station and a second compressing station contained in a second combination station. In yet another example, the first combination station is disposed at a first end of the advancing mechanism and the second combination station is disposed at a second end of the advancing mechanism. In still another example, the feed scrap collected at the collecting station is a loose feed scrap and wherein the feed scrap fed from the feed station is a roped feed scrap. In other examples, at least one of the twisting station and the compressing station include a plurality of rollers. In further examples, the plurality of rollers each include a plurality of teeth projecting from the rollers.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The same number represents the same element or same type of element in all drawings.

DETAILED DESCRIPTION

In the following description, numerous details are set forth to provide an understanding of various melter apparatus, mechanical binding systems, and process examples in accordance with the present disclosure. However, it will be understood by those skilled in the art that the melter apparatus, binding systems, and processes of using same may be practiced without these details and that numerous variations or modifications from the described examples may be possible which are nevertheless considered within the appended claims. All published patent applications and patents referenced herein are hereby incorporated by reference herein in their entireties.

Figure 1:
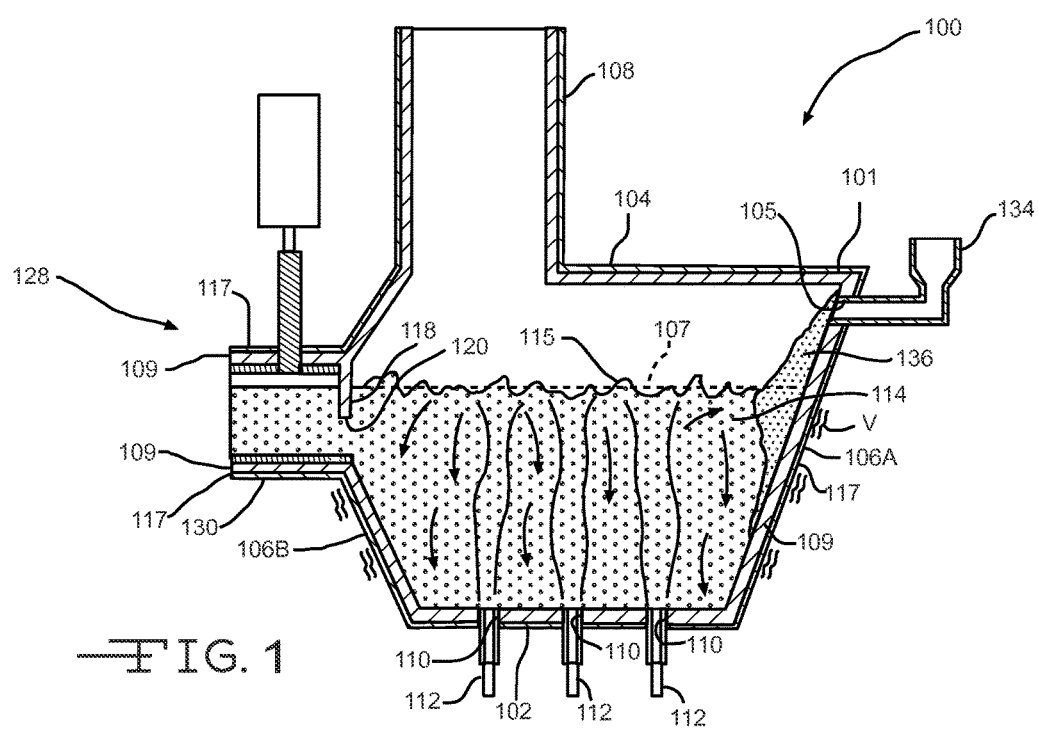
FIG. 1 depicts a side sectional view of a melter system that may be utilized in conjunction with examples of the technology described herein.

FIG. 1 depicts a side sectional view of a melter system 100 that may be utilized in conjunction with examples of the technology described herein. The melter system 100 is a submerged combustion melter (SCM) and is described in more detail in U.S. Patent Application Publication No. 2013/0283861, the disclosure of which is hereby incorporated by reference herein in its entirety. Melter apparatus or melt vessel 101 of FIG. 1 includes a floor 102, a roof or ceiling 104, a feed end wall 106A, a first portion of an exit end wall 106B, and a second portion of the exit end wall 106C. Each of the floor 102, the roof 104, and walls 106A, 106B, and 106C comprise a metal shell 117 and a refractory panel 109, some or all of which may be fluid-cooled. Exit end wall portion 106C may form an angle with respect to a skimmer 118.

The melt vessel 101 may be fluid cooled by using a gaseous, liquid, or combination thereof, heat transfer media. In certain examples, the wall may have a refractory liner at least between the panels and the molten glass. Certain systems may cool various components by directing a heat transfer fluid through those components. In certain examples, the refractory cooled-panels of the walls, the fluid-cooled skimmer, the fluid-cooled dam, the walls of the fluid-cooled transition channel, and the burners may be cooled by a heat transfer fluid selected from the group consisting of gaseous, liquid, or combinations of gaseous and liquid compositions that function or are capable of being modified to function as a heat transfer fluid. Different cooling fluids may be used in the various components, or separate portions of the same cooling composition may be employed in all components. Gaseous heat transfer fluids may be selected from air, including ambient air and treated air (for air treated to remove moisture), inert inorganic gases, such as nitrogen, argon, and helium, inert organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from inert liquids, which may be organic, inorganic, or some combination thereof, for example, salt solutions, glycol solutions, oils and the like. Other possible heat transfer fluids include water, steam (if cooler than the oxygen manifold temperature), carbon dioxide, or mixtures thereof with nitrogen. Heat transfer fluids may be compositions including both gas and liquid phases, such as the higher chlorofluorocarbons.

The melt vessel 101 further includes an exhaust stack 108, and openings 110 for submerged combustion burners 112, which create during operation a highly turbulent melt matrix indicated at 114. Highly turbulent melt matrix 114 may have an uneven top surface 115 due to the nature of submerged combustion. An average level 107 is illustrated with a dashed line. In certain examples, burners 112 are positioned to emit combustion products into molten matrix in the melting zone 114 in a fashion so that the gases penetrate the melt generally perpendicularly to floor 102. In other examples, one or more burners 112 may emit combustion products into the melt at an angle to floor 102.

In an SCM, combustion gases emanate from burners 112 under the level of a molten matrix. The burners 112 may be floor-mounted, wall-mounted, or in melter examples comprising more than one submerged combustion burner, any combination thereof (for example, two floor mounted burners and one wall mounted burner). These combustion gases may be substantially gaseous mixtures of combusted fuel, any excess oxidant, and combustion products, such as oxides of carbon (such as carbon monoxide, carbon dioxide), oxides of nitrogen, oxides of sulfur, and water. Combustion products may include liquids and solids, for example soot and unburned liquid fuels.

A burner 112 may be an air-fuel burner that combusts one or more fuels with only air, or an oxy-fuel burner that combusts one or more fuels with either oxygen alone, or employs oxygen-enriched air, or some other combination of air and oxygen, including combustion burners where the primary oxidant is air, and secondary and tertiary oxidants are oxygen. Burners may be comprised of metal, ceramic, ceramic-lined metal, or combination thereof. Air in an air-fuel mixture may include ambient air as well as gases having the same molar concentration of oxygen as air. Oxygen-enriched air having an oxygen concentration greater than 121 mole percent may be used. Oxygen may include pure oxygen, such as industrial grade oxygen, food grade oxygen, and cryogenic oxygen. Oxygen-enriched air may have 50 mole percent or more oxygen, and in certain examples may be 90 mole percent or more oxygen. Oxidants such as air, oxygen-enriched air, and pure oxygen may be supplied from a pipeline, cylinders, storage facility, cryogenic air separation unit, membrane permeation separator, or adsorption unit.

The fuel burned by the burners may be a combustible composition (either in gaseous, liquid, or solid form, or any flowable combination of these) having a major portion of, for example, methane, natural gas, liquefied natural gas, propane, atomized oil, powders or the like. Contemplated fuels may include minor amounts of non-fuels therein, including oxidants, for purposes such as premixing the fuel with the oxidant, or atomizing liquid fuels.

At least some of the burners may be mounted below the melt vessel, and in certain examples the burners may be positioned in one or more parallel rows substantially perpendicular to a longitudinal axis of the melt vessel. In certain examples, the number of burners in each row may be proportional to width of the vessel. In certain examples the depth of the vessel may decrease as width of the vessel decreases. In certain other examples, an intermediate location may comprise a constant width zone positioned between an expanding zone and a narrowing zone of the vessel, in accordance with U.S. Patent Application Publication No. 2011/0308280, the disclosure of which is hereby incorporated by reference herein in its entirety.

Returning to FIG. 1, the initial raw material can be introduced into melt vessel 101 on a batch, semi-continuous or continuous basis. In some examples, a port 105 is arranged at end 106A of melt vessel 101 through which the initial raw material is introduced by a feeder 134. In some examples, a batch blanket 136 may form along wall 106A, as illustrated. Feed port 105 may be positioned above the average matrix melt level, indicated by dashed line 107. The amount of the initial raw material introduced into melt vessel 101 is generally a function of, for example, the capacity and operating conditions of melt vessel 101 as well as the rate at which the molten material is removed from melt vessel 101.

As noted herein, submerged combustion burners may produce violent turbulence of the molten matrix and may result in a high degree of mechanical energy (e.g., vibration V in FIG. 1) in the submerged combustion melter that, without modification, is undesirably transferred to the conditioning channel. Vibration may be due to one or more impacts from sloshing of the molten matrix, pulsing of the submerged combustion burners, popping of large bubbles above submerged burners, ejection of the molten matrix from main matrix melt against the walls and ceiling of melt vessel 101, and the like. Melter exit structure 128 comprises a fluid-cooled transition channel 30, having generally rectangular cross-section in melt vessel 101, although any other cross-section would suffice, such as hexagonal, trapezoidal, oval, circular, and the like. Regardless of cross-sectional shape, fluid-cooled transition channel 130 is configured to form a frozen matrix layer or highly viscous matrix layer, or combination thereof, on inner surfaces of fluid-cooled transition channel 130 and thus protect melter exit structure 128 from the mechanical energy imparted from the melt vessel 101 to melter exit structure 128.

Figure 2:
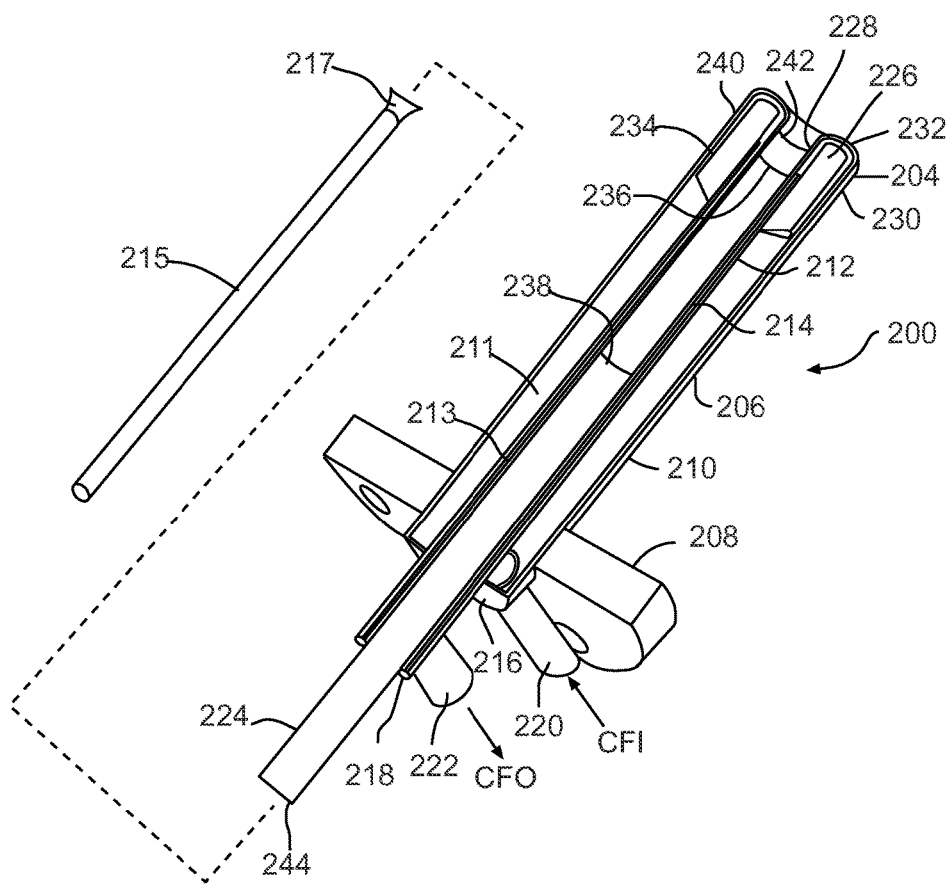
FIG. 2 depicts a side sectional view of a burner that may be utilized in conjunction with the examples of the technology described herein.

FIG. 2 depicts a side sectional view of a burner 200 that may be utilized in conjunction with the examples of the technology described herein. The burner 200 is an SCM burner having a fluid-cooled portion 202 having a burner tip 204 attached to a burner body 206. A burner main flange 208 connects the burner to an SCM superstructure or flange, illustrated below. Burner body 206 has an external conduit 210, a first internal conduit 212, a second internal conduit 214, and end plates 216, 218. A coolant fluid inlet conduit 220 is provided, along with a coolant fluid exit conduit 222, allowing ingress of a cool coolant fluid as indicated by an arrow CFI, and warmed coolant fluid egress, as indicated by an arrow CFO, respectively. A first annulus 211 is thus formed between substantially concentric external conduit 210 and first internal conduit 212, and a second annulus 213 is formed between substantially concentric first and second internal conduits 212, 214. A proximal end 224 of second internal conduit 214 may be sized to allow insertion of a fuel or oxidant conduit 215 (depending on the burner arrangement), which may or may not include a distal end nozzle 217. When conduit 215 and optional nozzle 217 are inserted internal of second internal conduit 214, a third annulus is formed there between. In certain examples, oxidant flows through the third annulus, while one or more fuels flow through conduit 215, entering through a port 244. In certain other examples, one or more fuels flow through the third annulus, while oxidant flows through conduit 215, entering through port 244.

The fluid-cooled portion 202 of the burner 200 includes a ceramic or other material insert 226 fitted to the distal end of first internal conduit 212. Insert 226 has a shape similar to but smaller than burner tip 204, allowing coolant fluid to pass between burner tip 204 and insert 226, thus cooling burner tip 204. Burner tip 204 includes an inner wall 228, an outer wall 230, and a crown 232 connecting inner wall 228 and outer wall 230. In prior art burners, welds at locations 234 and 236, and optionally at 238, 240 and 242, connect burner tip 204 to external conduit 210 and second internal conduit 214, using conventional weld materials to weld together similar base metal parts, such as carbon steel, stainless steel, or titanium. Despite the use of coolant and even titanium (which ordinarily is considered quite corrosion-resistant), the operating life of burners as illustrated and described in relation to FIG. 2 are very limited in the SCM environment, where temperatures of the molten matrix may reach 1300° C., and the turbulence of the molten matrix caused by the burners themselves as well as combustion gases contribute to form a highly erosive environment in contact with the burner tip. Other examples of SCM burners that can be used in conjunction with the technologies described herein are described in PCT Application Publication No. 2014/189501, the disclosure of which is hereby incorporated by reference herein in its entirety. SCM melters that utilize so-called dry tip burners can also be utilized.

The initial raw material may include any material suitable for forming a molten matrix, such as glass and/or inorganic non-metallic feedstocks such as rock (basalt) and mineral wool (stone wool). With regard to glass matrices, specifically, limestone, glass, sand, soda ash, feldspar and mixtures thereof can be utilized. In one example, a glass composition for producing glass fibers is "E-glass," which typically includes 52-56% $SiO_2$, 12-16% $Al_2O_3$, 0-0.8% $Fe_2O_3$, 16-25% CaO, 0-6% MgO, 0-10% $B_2O_3$, 0-2% $Na_2O+K_2O$, 0-1.5% $TiO_2$ and 0-1% $F_2$. Other glass compositions may be used, such as those described in U.S. Published Patent Application No. 2008/0276652, the disclosure of which is hereby incorporated by reference herein in its entirety. The initial raw material can be provided in any form such as, for example, relatively small particles.

In general, it is desirable to feed raw batch material into the melter system to control the formation of the molten matrix, ensure even melting, and avoid cool spots within the matrix that can cause a non-uniform matrix product. Loose feed scrap can be particularly difficult to feed evenly into the SCM burner vessel. Loose feed scrap can include portions of batt glass insulation that is produced during the insulation manufacturing process. The dimensions, densities, shapes, etc. of loose feed scrap can vary within a given volume of material. For example, the loose feed scrap can be cut or trimmed from finished insulation, resulting in oddly-shaped chunks of material that are difficult to introduce in a controlled fashion to the melt vessel. These chunks may also have different densities per unit volume, due to deliberate manufacturing processes or inadvertent manufacturing flaws that render the material undesirable for market. For example, some glass insulation may not have formed properly, leaving random dense masses of glass throughout the scrap. For these and other reasons, it has been discovered that it is beneficial to form the loose feed scrap into a substantially consistent form for introduction into a melt vessel in a controlled manner. The systems and methods described herein utilize mechanical binding processes (e.g., compression and twisting of loose feed scrap and the glass fibers) to form substantially continuous lengths of glass "rope" that can be introduced into a melt vessel. Moreover, and as noted above, if other types of feed stock (e.g., rock and mineral wool) can also be utilized in the described systems and methods. For clarity, however, feed scrap consisting primarily of glass will be described herein.

In general, the technologies described herein relate to systems and methods utilized to produce substantially consistent (with regard to, e.g., size, density, etc.) masses of feed scrap fiberglass wool for introduction into a melter system. The technologies transform disorganized, non-uniform, loose wool or loose feed scrap from a bin and generate a tight, twisted rope of material that is fed into a melt vessel for melting and refining. The system produces a continuous, deadened (e.g., non-expanding) rope of material with sufficient size uniformity and feed rate so as not to disrupt stable operation of the melter. The rope has sufficient strength to enable a set of rollers to feed the rope into the melter from its exterior, thereby requiring no moving mechanisms inside the melter. If desired, however, static guides can be used.

In examples, the final roller station and entry port in the melter wall may be cooled such that the rope will not begin to melt outside the melter. Additionally, by not melting outside the melter, binder volatiles are not released. The entry port in the melter wall may be as small as practical to minimize melter gas emissions through the port. The bin, disposed at a front end of the system, may incorporate moving walls and a moving bottom surface, as well as constraining conveyors such that a controlled flow of loose wool is fed into twist rollers and/or compression stations having a number of rollers. The walls, conveyors, and twisting/compression stations may be independently reversible. Individual reversibility of components helps stretch any heavy or large lumps of wool that would may be drawn into the system from the bin.

The number of roller stations, as well as their configurations and operation may influence the final size, limpness, density, and twist imparted in the wool rope. In one example, a combination station having both twit and compression functionality may incorporate two or more driven rollers. Each roller may be disposed at oblique angles to the feed direction, such that the rollers cause both compression of the product and impart twist in it. Subsequent roller stations may utilize rollers having more prominent oblique angles, faster drive speed relative to prior stations, smaller rollers, and more closely spaced rollers. This can help further reduce the diameter of, and increase the density of, the finished rope. The number of rollers, diameter of rollers, oblique angles of the rollers, roller teeth shape/quantity/spacing, and station-to-station spacing may each affect the degree of twist, rope diameter, and the compression imparted into the material rope (and thus the resulting density thereof). The roller stations crush and deaden the material to further diminish the recovery/expansion thereof as it leaves any roller station.

The roller surfaces may both grip and crush the feed scrap, thereby reducing recovery or expansion of the material downstream of any roller station. Additionally, this provides load transfer from the rollers into the material, thereby further feeding the twisted/compressed feed scrap forward to each subsequent station. Each roller surface may incorporate hardened teeth, such as carbide, that may enable both the gripping and crushing of the material. The spacing, quantity, shape, and arrangement of such teeth may influence the performance of the rollers. Each roller station may utilize a different configuration of such teeth on its rollers. While the described technology utilizes as initial raw material loose feed scrap in the form of bonded and cured batt insulation of virtually any size, the technologies described herein may also utilize feed scrap in the form of unbonded loose fill wool. With these general considerations in mind, specific examples of systems and methods for mechanically binding loose feed scrap are described below.

Figure 3:
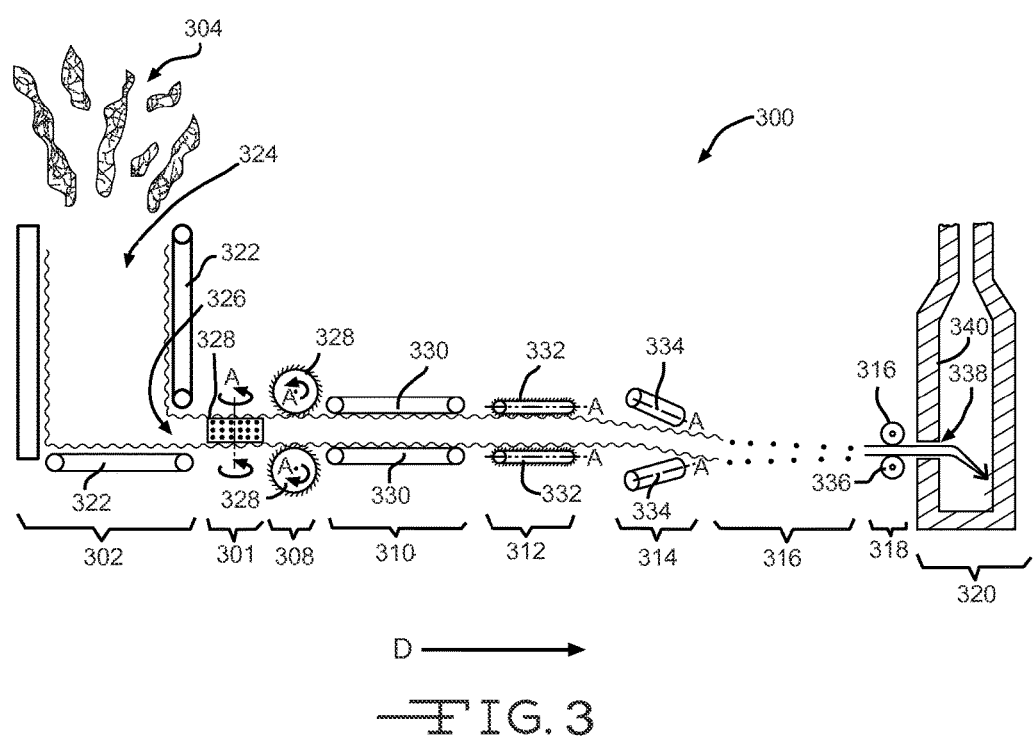
FIG. 3 depicts a schematic view of a system for mechanically binding loose feed scrap.

FIG. 3 depicts a schematic view of a system 300 for mechanically binding loose scrap. The various stations are first described generally below. As depicted in FIG. 3, a feed direction D of the material is generally left-to-right in the system 300. The system includes a collection station 302, into which loose feed scrap 304 is amassed and collected. The loose feed scrap 304 can be dumped into the bin via mechanical equipment or the emptying of containers. The feed scrap 304 exits the collection station 302 and enters one or more compression stations 306, 308 that compress the feed scrap 304. The compressed feed scrap 304 is moved along an advancing mechanism 310. In general, the advancing mechanism 310 advances the feed scrap 304, generally without significant compression or twisting. Thereafter, the feed stock enters a twisting station 312 to twist together the feed scrap 304. The feed scrap 304 can then be fed to a combination twisting/compression station 314 that both twists the feed scrap 304 and reduces a thickness thereof simultaneously. The feed scrap 304 can be fed through further advancing mechanisms, compression stations, twisting stations, twisting/compression stations, etc., (depicted generally as 316) as required or desired for a particular application. The feed scrap is then advanced through an exit station 318 before being fed into an SCM melt vessel 320 as a mechanically bound and twisted rope of material.

In more detail, the collection station 302 includes one or more conveyors 322 that form walls and a floor of a bin into which the loose feed scrap is deposited via an open inlet 324. These conveyors 322 can be actuated in either in a forward direction (e.g., thus moving the feed scrap in a direction generally towards an outlet 326) or in a rearward direction (e.g., thus moving the feed scrap in a direction generally away from the outlet 326). In general, the conveyors 322 advance the feed scrap towards the outlet 326, where they are compressed at the first compression station 306 and the second compression station 308. Each compression station 306, 308 may include a plurality of rollers 328 having axes A mounted generally orthogonal to (but offset from) the advancing feed scrap. In the depicted system 300, the first compression station 306 includes two rollers 328 (only one of which is depicted) rotating around vertical axes A. The second compression station 308 includes two rollers 328 rotating around horizontal axes A. Further details of the rollers 328 are described below. The compression stations 306, 308 generally define the outer volume of the feed scrap 304 as it exits the outlet 326. The rollers 328 are spaced so as to compress the feed stock into a first volume having first dimensions. These dimensions will be reduced as the feed scrap passes through the remaining stations of the system 300. As such, the density of material will increase within a particular cross section of the feed scrap as it advances through the system 300. Repeated compression of the feed scrap though a number of stations is desirable because this reduces resiliency and recovery of the feed scrap. This resiliency is undesired, as it prevents the formation of a tight rope of material. The structure, operation, and construction of the conveyors and compression stations (including, e.g., surface textures, speeds, and protrusions) further grip and crush the feed scrap so as to obtain the desired effect of diminishing the resiliency/recovery thereof. Additionally, the feed scrap becomes entangled with adjacent pieces of scrap. In so doing, a twisted shape is formed from all the discrete pieces of scrap as that shape is most easily mechanically handled through the system. In a single system 300, twisting stations may twist the feed scrap in both clockwise and counterclockwise directions, further reducing resiliency. Certain stations may twist in both directions.

The compressed feed scrap is then advanced by the advancing mechanism 310, which generally includes a plurality of conveyors 330 that maintain the general outer dimension of the compressed feed stock, but without further mechanical binding actions (such as twisting and compression). In FIG. 3, only two conveyors 330 are depicted, one above and one below the feed scrap. Conveyors may also be disposed on the sides of the feed scrap, so as to contain and move the material. In other examples, the fixed walls can be located on the sides of the advancing mechanism to prevent loss of material. The feed stock next enters a twisting station 312. This feed station includes a number of rollers 332 having axes disposed substantially parallel to the advancing feed scrap. Further details of the rollers 332 are provided below. In general, however, the rollers 332 advance the feed scrap through the twisting station 312 while at the same time twisting the various pieces of feed scrap together into a substantially continuous mass. Although a precise twisting pattern is not critical, the feed stock forms into a substantially continuous mass by twisting and therefore binding together discrete pieces of loose scrap. Additionally and substantially simultaneously, twisting further binds together individual threads of a single piece of loose scrap. Threads of a first piece of loose scrap may also be twisted with threads of a second piece of loose scrap, further mechanically binding the loose scrap together. After passing through the first twisting station 312, the feed scrap now begins to take on the form factor of a bound, substantially continuous rope.

The feed scrap advances to the twisting/compression station 314 that includes a number of rollers 334 having axes disposed oblique to the advancing feed scrap. Further details of the rollers 334 are provided below. In general, however, the rollers 334 advance the feed scrap through the twisting/compression station 314 while at the same time twisting the various pieces of feed scrap together into a substantially continuous mass. The twisting aspect of the station 314 is described above with regard to the actions of station 312. In addition to twisting the feed scrap, the rollers 334 also further compress the scrap as it moves through the twisting/compression station 314. This further binds the mass together, further decreases the dimensions thereof, and as such, further increases the density of a particular cross section thereof. Additionally, since the rollers 334 are disposed substantially lengthwise to the advancing feed scrap (as opposed to the rollers 328 disposed substantially widthwise thereto), and in view of the rotation about axes A, the feed scrap mass begins to take on a form having a substantially circular cross section (e.g., similar to that of a rope).

Subsequent twisting/compression stations are not necessarily required, but it has been discovered that a plurality of twisting/compression stations may further define and control the dimensions and density of the rope material. As such, further advancing mechanisms, compression stations, twisting stations, twist/compression stations, coil stations (in the form of rollers or storage bins), etc., are depicted generally as 316. These may be utilized as required or desired for a particular application. For example, depending on the desired diameter of the rope material, further compression stations may be utilized. Systems 300 having a collection station 302 particularly remote from the SCM melter 320 may require additional advancing mechanisms to move the rope material towards melter 320. In such an example, most of the stations may be disposed in a location (e.g., a room) remote from a room containing the SCM melter. As such, the rope material may be advanced into the room with the melter for feeding. Additionally, the rope may be stored at a coil station in a coiled configuration and uncoiled as desired to be fed into the melter 320. Other configurations are contemplated. The exit station 318 defines the approximate end of the system 300 and is used to feed the mechanically bound, twisted/compressed rope material into the SCM melter 320. In an example, the exit station 318 includes a plurality of rollers 336 disposed widthwise relative to the feed direction of the rope. The rollers 336 advance the rope material into an entry port 338 defined by a wall 340 in the SCM melter 320. The rollers 336 and entry port 338 may be cooled such that the rope will not begin to melt outside the melter 320. The geometry/configuration of the rollers and enclosure (not shown) may be configured to control gases entering or exiting the melter through 338.

Figure 4:
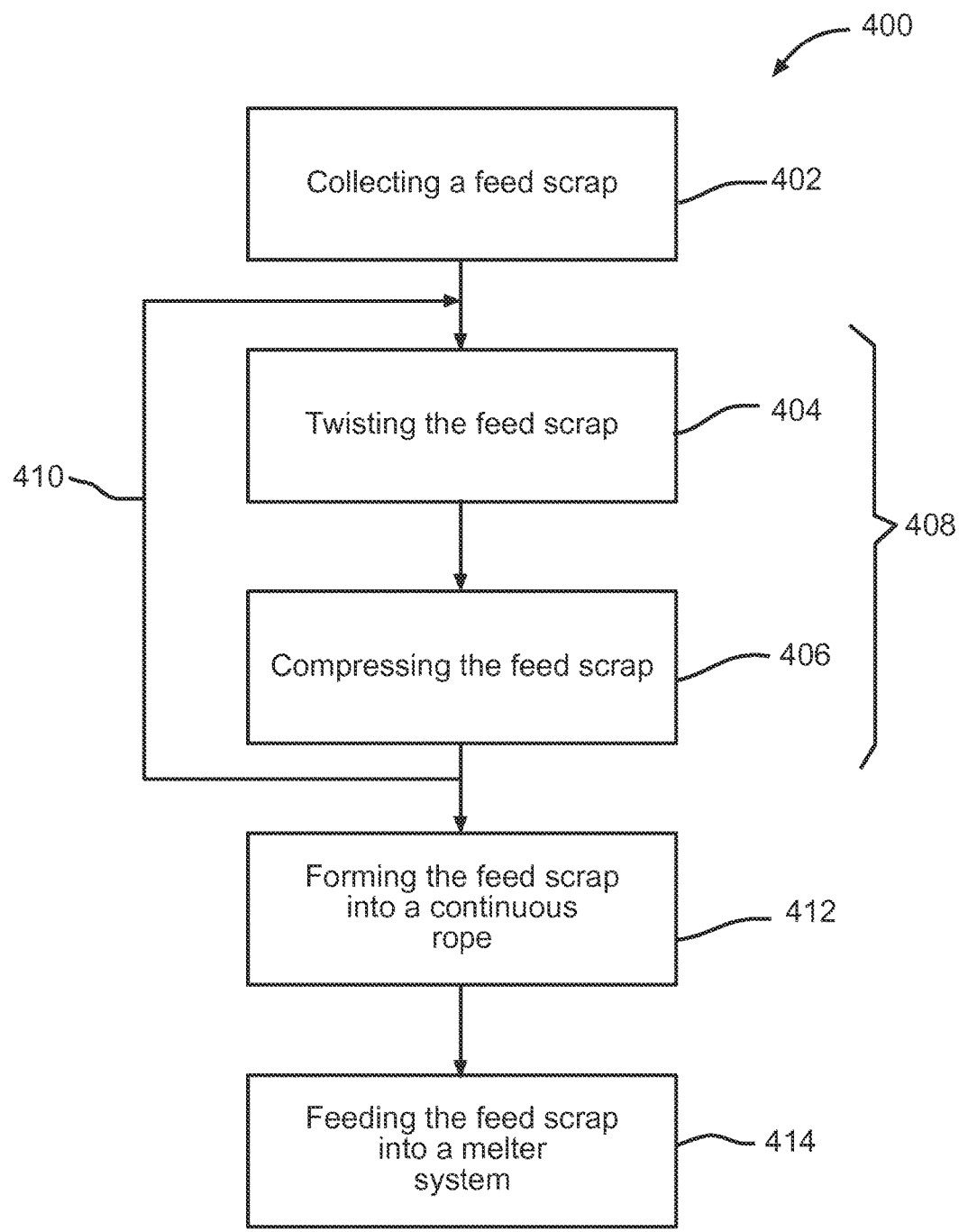
FIG. 4 depicts a method for mechanically binding loose feed scrap.

FIG. 4 depicts a method 400 for mechanically binding loose scrap. In operation 402, the feed scrap is collected in a substantially loose form. In operation 404, the feed scrap is twisted. This operation 404 contemplates both twisting discrete pieces of scrap upon themselves, and also contemplates twisting discrete pieces of scrap into other discrete pieces of scrap. In operation 406, the scrap is compressed, which increases the density of the material. Operations 404 and 406 may be performed at discrete locations at one or more times between the collecting operation 402 and a feeding operation 414 (described below). In another example, both of operations 404 and 406 may be performed in a simultaneous operation 408. Additionally or alternatively, the individual twisting operation 404, compression operation 406, and/or simultaneous operation 408 may be repeated any number of times, as indicated by loop 410. Indeed, as the feed scrap passes through, e.g., a first simultaneous operation 408, it exits the operation 408 having a first, twisted configuration having a first diameter and a first density. As the simultaneous operation 408 is repeated via loop 410, and the feed scrap passes through a second simultaneous operation 408 downstream of the first simultaneous operation 408, it exits that operation 408 having a second, twisted configuration having a second dimension and a second density. As the feed scrap has been compressed and twisted, the second diameter is generally less than the first diameter, while the second density is generally greater than the first density. These operations twist and compress the feed scrap so as to form a substantially continuous rope, as indicated in operation 412. This feed scrap, in the form of a rope, may then be fed into a melter system in operation 414. In its broadest terms, the technologies described herein advance a loose feed scrap in a system that substantially simultaneously twists and compresses the loose feed scrap into a mechanically-bound, rope-like material for delivery to a melt system. In examples, the twisting and compression operations 404, 406 may be discontinuous, intermittent, or may be performed in opposite directions. This can create partial tears or elongations of the continuous rope, which may help to spread bulges or high density clumps in the feed scrap. Such operations may also create further tension in the rope, deadening of resiliency/recovery, and alignment of the feed scrap within the rope.

Figure 5:
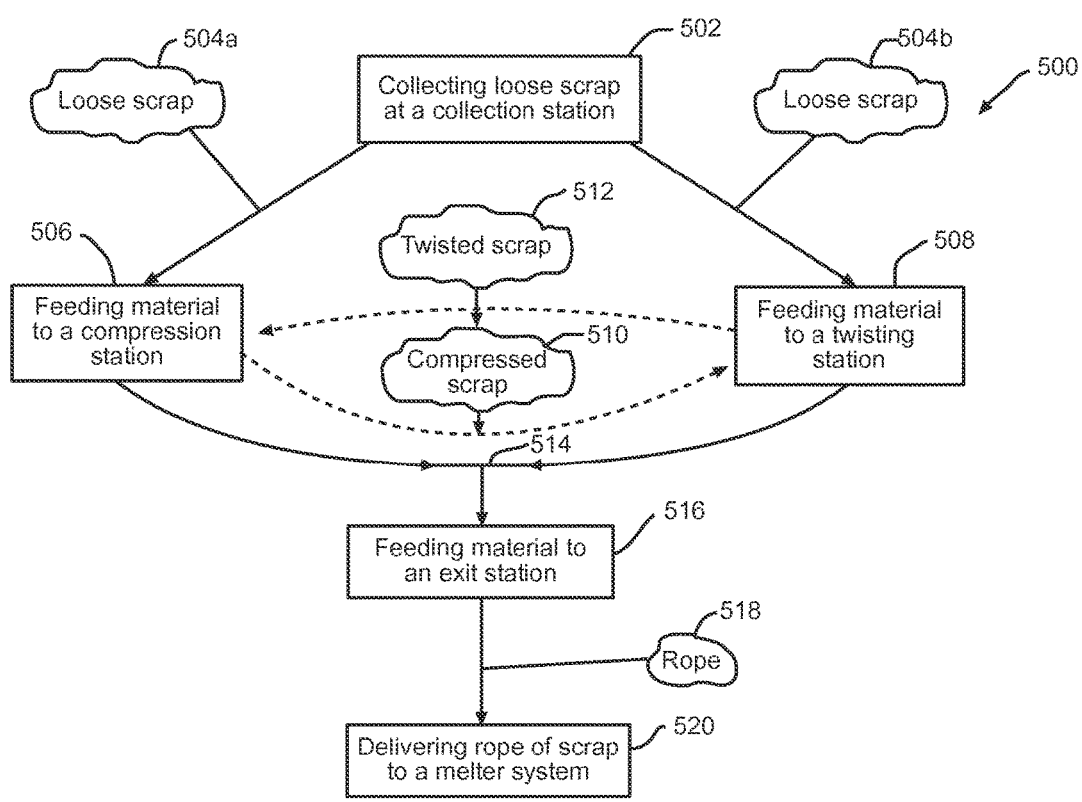
FIG. 5 depicts a method for mechanically binding loose feed scrap with the system of FIG. 1.

FIG. 5 depicts a method 500 for mechanically binding loose scrap, e.g., with the system of FIG. 3, and other arrangements based on that system. Each of the various stations are described in association with FIG. 1. In operation 502, loose feed scrap is collected at a collection station, which may include a number of conveyors to move material within the station, as well as to discharge the material therefrom. Thereafter, between the various stations of the system may be one or more conveyors for moving material from one station to the next. Alternatively, a station upstream from another station may directly feed material to a downstream station (e.g., without the use of a conveyor). From the collection station 502, loose scrap 504*a* may be fed as material to a compression station, as depicted in operation 506. It has been determined that a compression station disposed immediately downstream of the collection station may help more quickly define and contain the outer dimensions of the mass of material. As such, operation 506 immediately following operation 502 may be desirable. Alternatively, from the collection station 502, loose scrap 504*b* may be fed as material to a twisting station 508. The operation of compression and twisting stations are described elsewhere herein. Thereafter, compressed scrap 510 may be fed as material to the twisting station in operation 508. This is the configuration previously depicted in FIG. 5. This compressed scrap 510 has a density higher than that of the loose scrap 504*a* fed into the compression station. Similarly, twisted scrap 512 can be fed as material to the compression station in operation 506. This twisted and bound scrap 512 typically has a substantially continuous length greater than that of the longest pieces of loose scrap 504*a* fed into the twisting station.

Of course, and as depicted in FIG. 3, the twisting station and the compression station may be combined into a combination station that performs both functions substantially simultaneously. Alternatively or additionally, feed scrap may pass through a plurality each of the compression stations and the twisting stations. Output material 514 from the compression station and/or the twisting station 508 is fed to an exit station in operation 516 and exits that station as a rope of material 518. This rope 518 is delivered in operation 520 to a melter system where it is melted into a matrix.

Figure 6:
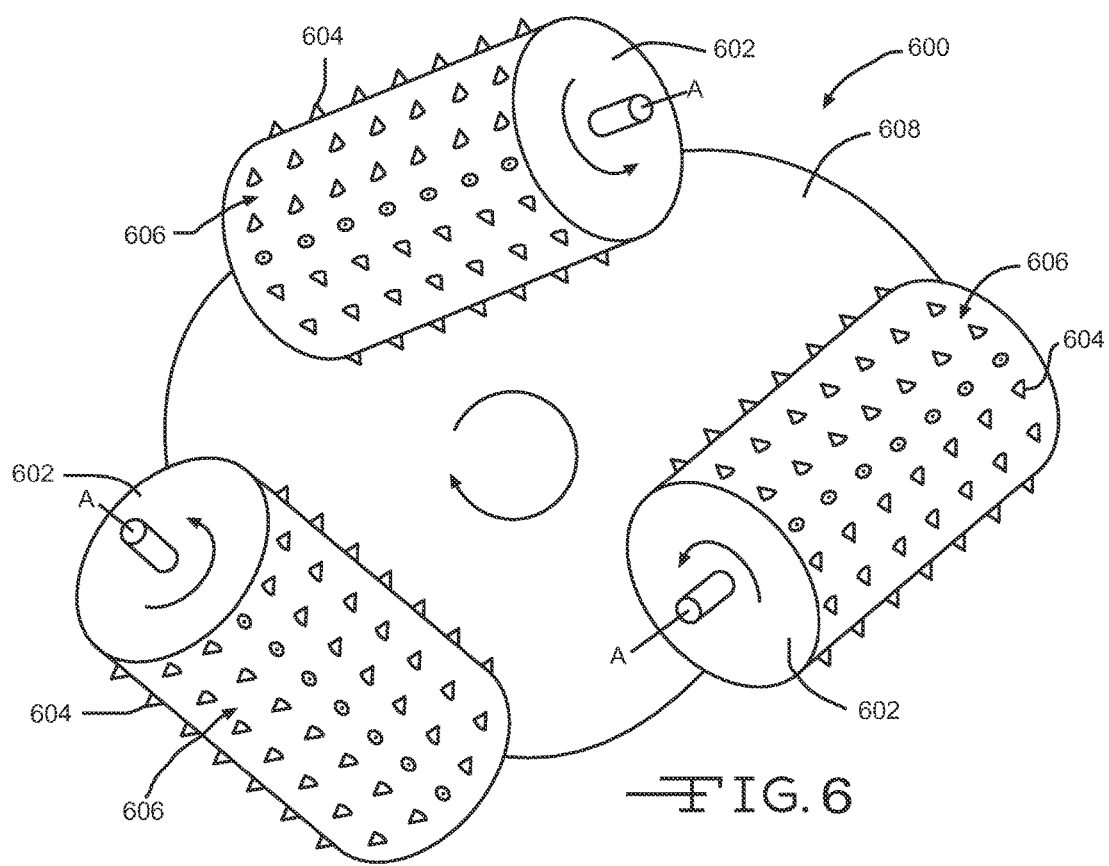
FIG. 6 depicts front view of a roller station utilized in the system of FIG. 1.
Figure 7:
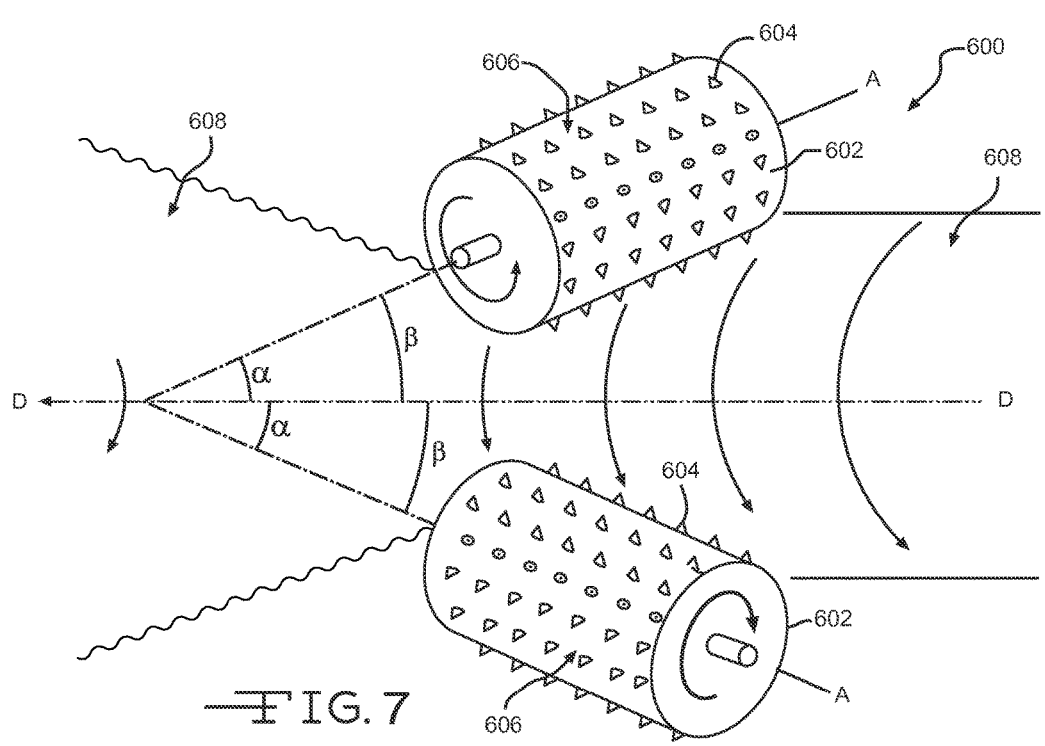
FIG. 7 depicts a side view of the roller station of FIG. 6.

FIG. 6 depicts front view of a roller station 600 utilized in the system of FIG. 3. More specifically, in view of the number and orientation of the rollers 602, FIG. 6 depicts a combination twist and compression station 600. Each roller 602 rotates about an axis A, which in the depicted example, is in a counterclockwise direction. The rollers 602 include a plurality of teeth 604 extending from an outer surface 606 therefrom. The teeth 604 may have a number of different configurations, as described in more detail below. FIG. 7 depicts a side view of the roller station 600 of FIG. 6. As can be seen, the rollers 602 are disposed at two angles $\alpha$, $\beta$ to a direction of travel axis D. The direction of travel axis D represents the general direction along which the scrap material 608 moves through the station 600 (and the system generally). Scrap material 608 enters the proximity of the rollers 602 and is drawn therethrough by contact with the rollers 602 and the teeth 604, which grip, pull, and twist the scrap material 608 and draw it along the direction of travel axis D. By orienting the rollers 602 at an angle $\alpha$ to the direction of travel D, the rollers 602 compress and twist the scrap material 608 as it passes through the station 600. This, in turn, increases the density of the material and forms the material into a substantially continuous rope of material.

Subsequent roller stations may be similarly categorized to further compress and twist the material into a tighter, more dense rope of material. Each roller 602 has two oblique angles $\alpha$, $\beta$ relative to the feed direction D (i.e., coaxial with the approximate rope centerline) such that the rollers 602 cause both compression of the material and impart twist in it. In FIG. 6, the tail end of each roller 602 (the end further downstream along the rope centerline) is closer to the centerline of the rope to amplify compression of the rope as the rope proceeds downstream within any single roller 602. The angle $\alpha$ at which the roller 602 is disposed may be between about 0° to about 45° off the rope axis, preferably 5° to about 20°. Additionally, the rotational axis of the roller 602 is not parallel to the centerline of the rope, so as to impart additional twist. As such, this angle $\beta$ may be about 0° to about 45° off the rope axis, preferably 5° to about 20°.

Figure 8A:
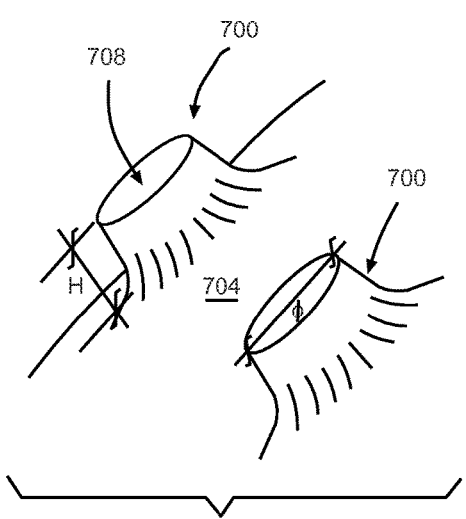
FIGS. 8A and 8B depict examples of teeth utilized in the roller stations of the systems of FIG. 1.
Figure 8B:
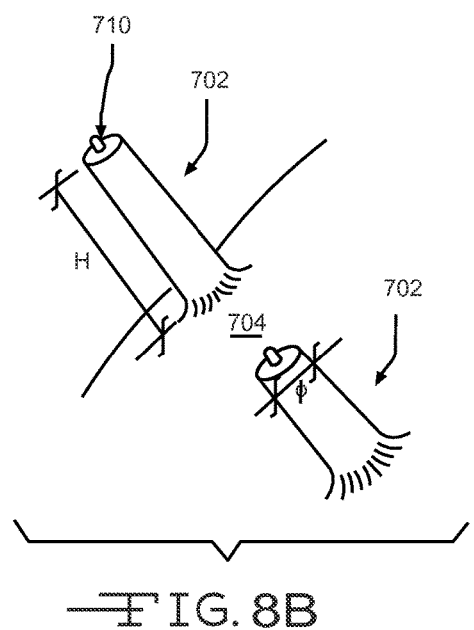

FIGS. 8A and 8B depict examples of teeth 700 utilized in the roller stations of FIG. 6. As described above, a number of roller stations are utilized, each performing different functions. In the systems described herein, for example, rollers dedicated to compressing the loose scrap, rollers dedicated to twisting the loose scrap, and rollers that perform both functions are utilized. Each of these types of rollers generally also perform an advancing function, moving the material through a respective station. As such, it has been determined that teeth projecting from the rotors can aid in these functions. FIGS. 8A and 8B depict such teeth. FIG. 8A depicts so called crushing teeth 700. FIG. 8B depicts so-called gripping teeth 702. The terms crushing and gripping describe generally the primary function of the particular type of teeth 700, 702, but are not intended to be limiting or mutually exclusive. That is, crushing teeth 700 can also perform some gripping function, while gripping teeth 702 can also perform some crushing function. The terms are used to describe the general physical characteristics of the teeth 700, 702 so as to differentiate different types of teeth from each other.

In general, crushing teeth 700 have a larger diameter $\phi$ than the diameter $\phi$ of the gripping teeth 702. Another distinction is the height H of the crushing teeth 700 above the roller surface 704. That is, the height H of the crushing teeth 700 is generally less than the height H of the gripping teeth 702. The taller height of the gripping teeth 702 allows those teeth 702 to penetrate deeper into the material so as to pull and twist the material as the rollers rotate. Additionally, a top surface 708 of the crushing teeth 700 is generally flat. This allows the crushing teeth 700 to push larger quantities of the material together so as to aid in compression thereof. A top surface 710 of the gripping teeth 702, however, can have a generally pointed construction, so as to more easily separate and penetrate the material.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. A method comprising:
   collecting, at a collection station, loose feed scrap;
   feeding the loose feed scrap to a compression station in a feed direction where the loose feed scrap is compressed into a compressed feed scrap having a density higher than a density of the loose feed scrap;
   feeding the loose feed scrap to a twisting station where the loose feed scrap is twisted into a bound feed scrap having a substantially continuous length greater than a length of the loose feed scrap, wherein the twisting station comprises a plurality of rollers disposed at two oblique angles to the feed direction, and wherein each of the plurality of rollers comprise a plurality of teeth extending therefrom;
   feeding at least one of the compressed feed scrap and the bound feed scrap to an exit station, wherein the at least one of the compressed feed scrap and the bound feed scrap exit the exit station as a rope of scrap; and delivering the rope of scrap to a melter system.

2. The method of claim 1, wherein the compression station and the twisting station are a combined station.

3. The method of claim 2, wherein the combined station includes three rollers.

4. The method of claim 2, wherein the plurality of rollers are disposed at an angle to a general direction of movement of the loose feed scrap.

5. The method of claim 1, wherein the compression station comprises a plurality of compression stations and the twisting station comprises a plurality of twisting stations.

6. The method of claim 5, wherein at least one of the feeding operations include moving a material via at least one conveyor.

7. The method of claim 1, wherein the collection station includes a plurality of conveyors configured to move the loose feed scrap.

8. The method of claim 7, wherein the plurality of conveyors of the collection station are configured to move in a generally forward direction and a generally backward direction.

9. The method of claim 1, wherein the rope of feed scrap is delivered to a melter system at an entry port of an SCM melt vessel, wherein the SCM port has a port temperature lower than a temperature of the SCM melt vessel.

10. A method comprising:
collecting a feed scrap;
twisting the feed scrap;
substantially simultaneously with twisting the feed scrap, compressing the feed scrap with a plurality of rollers disposed at two oblique angles to a feed scrap direction, so as to form a substantially continuous rope; and
feeding the twisted feed scrap and the compressed feed scrap into a melter system.

11. The method of claim 10, wherein the forming operation is performed substantially simultaneously with the twisting operation and the compressing operation.

12. The method of claim 10, wherein the rope is fed into the melter system during the feeding operation.

13. The method of claim 10, wherein the twisting operation and the compression operation are performed between the collecting operation and the feeding operation at a station comprising three rollers, wherein each of the three rollers comprise a plurality of teeth.

14. The method of claim 13, wherein the twisting operation and the compression operation are performed at a first simultaneous operation to produce a first twisted, compressed feed scrap output having a first diameter and a first density.

15. The method of claim 14, wherein the twisting operation and the compression operation are performed at a second simultaneous operation downstream of the first simultaneous operation to produce a second twisted, compressed feed scrap output having a second diameter less than the first diameter and second density greater than the first density.

16. A method of forming a rope material from a loose feed scrap, the method comprising:
substantially simultaneously advancing, twisting, and compressing the loose feed scrap through a twisting and compression station comprising a plurality of rollers disposed at two oblique angles to a loose feed scrap direction, wherein the loose feed scrap is advanced through the twisting and compression station until the rope material is formed.

\* \* \* \* \*